April 14, 1970 TETSUO SHIMOSAKI 3,505,910
SPEED CHANGE CONTROL DEVICE FOR THE AUTOMATIC TRANSMISSION
CONTROL SYSTEM USED FOR AUTOMOTIVE VEHICLES
Filed March 1, 1968 3 Sheets-Sheet 1

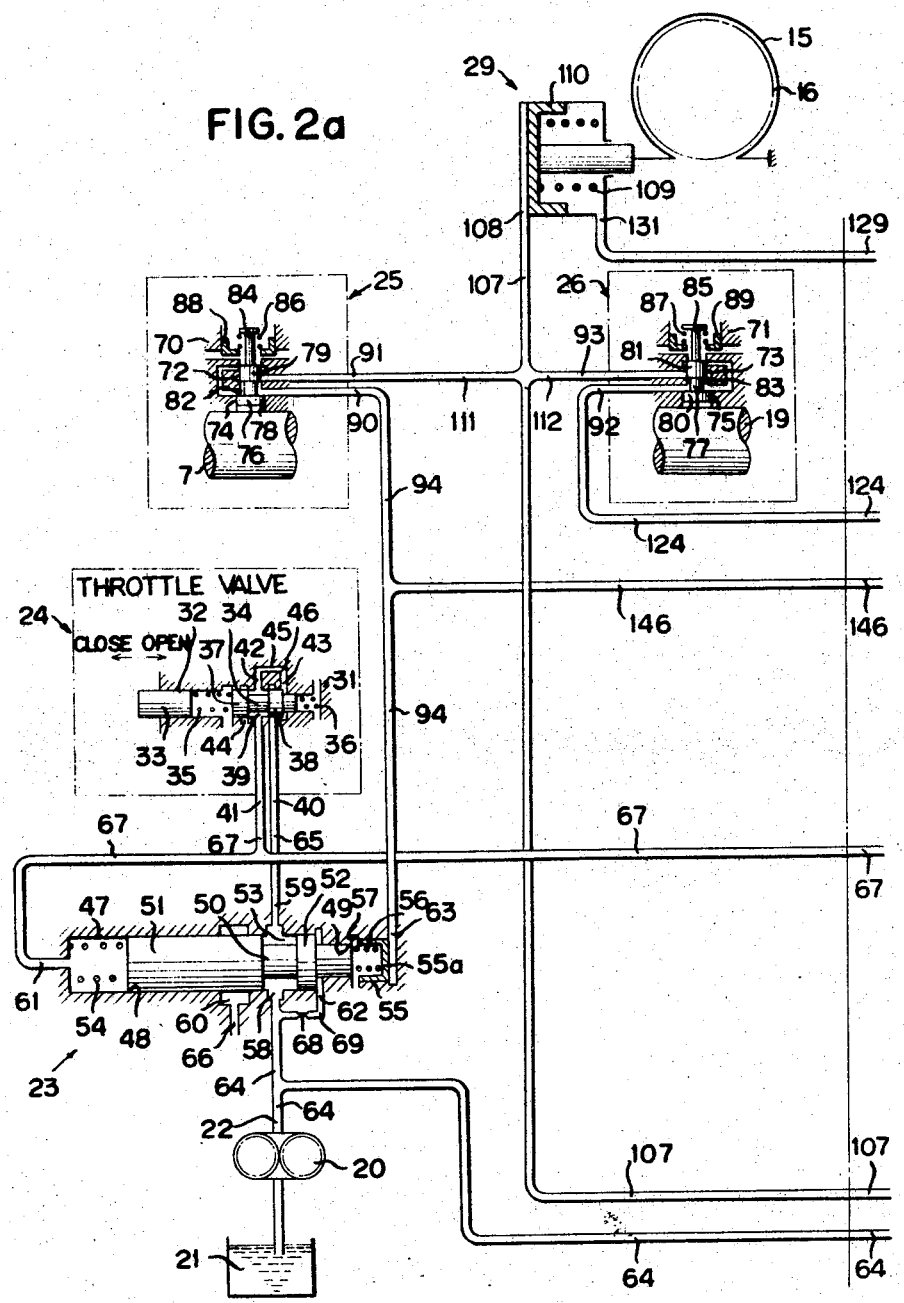

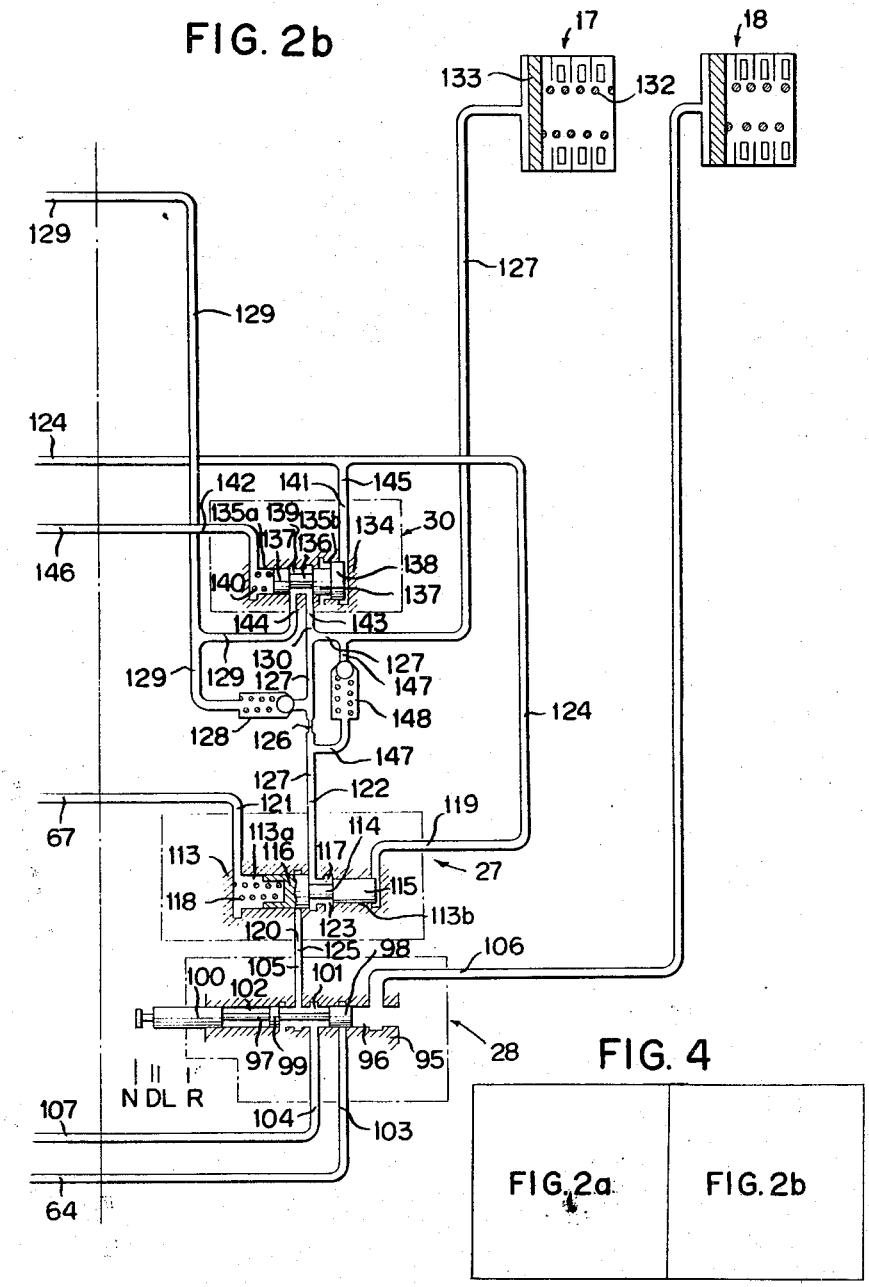

United States Patent Office 3,505,910
Patented Apr. 14, 1970

3,505,910
SPEED CHANGE CONTROL DEVICE FOR THE AUTOMATIC TRANSMISSION CONTROL SYSTEM USED FOR AUTOMOTIVE VEHICLES
Tetsuo Shimosaki, Hiroshima-ken, Japan, assignor to Toyo Kogyo Kabushiki Kaisha, Hiroshima-ken, Japan, a corporation of Japan
Filed Mar. 1, 1968, Ser. No. 709,714
Claims priority, application Japan, Mar. 7, 1967, 42/14,567
Int. Cl. B60k 21/04
U.S. Cl. 74—864     2 Claims

ABSTRACT OF THE DISCLOSURE

This invention provides an improved speed change or transmission control device for automotive vehicles by effectively controlling the neutral time of the speed change gears, especially when a down shift operation is carried out, by providing two governor valves on the drive shaft and driven shaft, respectively, which are arranged in front of and behind the speed change gear, respectively, to control the opening and closing operation of the shift control valve by detecting the speeds of rotation of the drive and driven shafts.

---

This invention relates to a transmission controlling device of an automatic speed change device for vehicles comprising a fluid joint such as torque converter and speed change gears containing several frictional members such as clutches or band brakes and oil pressure circuits having a number of valves.

Generally, in an oil pressure circuit of automatic speed change gears of this kind, a governor valve as the detecting means for detecting the speed of the rotation of the driven shaft provided on the output side of the speed change gears, a throttle valve for detecting the degree of the opening of a throttle valve of the carburetor, and a shift valve to be switched over in accordance with the generated torque of the engine and the speed of the vehicle by the governor pressure and throttle pressure supplied from the governor valve and throttle valve, are provided. The speed change operations can be carried out by engaging or disengaging the frictional members through the opening and closing of the shift valve. When the speed change operation is carried out from low speed forward drive to high speed forward drive, i.e., when an up-shift is carried out, or when the speed change operation is carried out from high speed forward drive to the low speed forward drive, i.e., when a down-shift is carried out, it is generally carried out within a remarkably short time, but on the other hand, the speed of the vehicle is to be kept constant by the inertia of the vehicle, and therefore it is necessary to raise or lower the speed of the rotation of the drive shaft to a valve determined by a gear ratio after the speed change, so as to adjust the speed ratio of rotation between the drive shaft and the driven shaft.

In other words, when the low speed forward drive state where the frictional members for low speed are engaged, to the high speed forward drive state, where the frictional members for high speed are engaged, it is necessary to lower the speed of the rotation of the drive shaft from $N_1$ to $N_2$ when the speed change point depending running state is on point A of FIG. 3, and on the other hand, when the high speed forward drive state where the frictional members for high speed are engaged is changed into the low speed forward drive state, where the frictional members for low speed are engaged, it is necessary to raise the speed of the rotation of the drive shaft from $N_2$ to $N_1$ when the speed change point is on point A as the same as in the preceding case.

tional members for high speed are engaged and the frictional members for low speed are disengaged, and the speed of the rotation of the drive shaft can be easily lowered from $N_1$ to $N_2$ forcibly by the rotation transmitted from the driven shaft, and therefore there is no trouble at all.

However, when a down shift is carried out, the speed of the rotation of the drive shaft is required to be raised from $N_2$ to $N_1$, so that the speed change gear device is kept in the neutral state for a predetermined period, and during which period, the speed of the rotation of the engine is raised and simultaneously, the speed of the rotation of the drive shaft is raised to a speed of the rotation proportional to the speed change ratio of the low speed forward drive, i.e., up to point $N_1$, and then the frictional members for low speed must be engaged, and therefore the adjustment of the period for keeping the neutral state becomes a remarkably difficult problem.

In other words, the automatic speed change or transmission control of this kind is generally carried out by the opening and closing operations of the shift valve, and throttle pressure and governor pressure work from both sides of the shift valve, and in accordance with the change of these oil pressures, the shift valve is opened or closed so as to carry out the speed change operations, and therefore the speed change point is variously changed by the changes of the governor pressure and throttle pressure. For example, when the degree of the opening of the throttle valve is small and the throttle pressure is low, the shift valve is opened against the repelling force of a spring and the throtttle pressure even when the governor pressure is low and the line pressure supplied from the oil pump is supplied to the frictional members so that the speed change is carried out at a relatively low vehicle speed. On the other hand, when the degree of the opening of the throttle valve is large, and throttle pressure is high, it is necessary to have sufficiently high governor pressure for moving the shift valve against the repelling force of the throttle pressure and the spring, and the speed change operation is carried out at a relatively high vehicle speed.

As mentioned above, since the speed change point can be variably changed in accordance with the change of the governor pressure and throttle pressure, it is necessary to adjust the neutral time in the case of a down shift to be in the state appropriate for the respective speed change points.

However, in the conventional automatic speed change device, an orifice controlling valve and a plurality of contraction portions are provided in the controlling circuit of the downshift, i.e., the oil pressure circuit on the open side of a low servo-valve of the frictional members for low speed, and said orifice controlling valve is controlled with the governor pressure which changes in accordance with the change of the vehicle speed, and when a down shift is carried out at a high vehicle speed, the oil supplied to the circuit on the open side of the low servo-valve of the frictional members for low speed is discharged at the oil outlet opening through a small number of the contraction portions by the operation of the orifice controlling valve, and when a down shift is carried out at a low vehicle speed, the oil supplied to the open side circuit of the low servo-valve of the frictional members for low speed is discharged at the oil outlet opening through a large number of the contraction portions. In other words, in the conventional means, at a certain speed change point of high vehicle speed, the resistance of the conduit pipe is great due to the contraction portions when the oil within the open side circuit of the low servo-valve is discharged so that the oil discharge operation is carried out relatively slowly, and therefore the time after the controlling members for high speed are disengaged, and till the controlling members for low speed are engaged, i.e., the neutral time, is retained longer; and at a certain speed change point of low vehicle speed, the resistance in the conduit pipe caused by contraction portions, when the oil within the open side circuit of the low servo-valve is discharged, is relatively small, and the oil discharge operation can be relatively quickly carried out, and therefore the time after the frictional members for high speed are disengaged and till the frictional members for low speed are engaged, i.e., the neutral time, can be retained relatively shorter, with the result, such a speed change effect as to be satisfactory only at the speed change point having been predetermined, but at other speed change points, the neutral time becomes too long or too short, and shock is necessitated when speed change is carried out which sacrifices the living condition.

This invention was attained from the above given standpoint, and the object of this invention is to improve the speed change effect by controlling the neutral time of the speed change gears through the opening and closing operation of the down shift controlling valve provided on the down shift controlling circuit, i.e., the open side circuit of the servo-valve of the frictional members for low speed by the oil pressure adjusted by the two governor valves, i.e., the governor pressure, by providing two governor valves, as the means for detecting the speed of the rotation of the drive shaft and driven shaft, on these shafts which are provided in front of and behind the speed change gear device, respectively.

The present invention will be described more in detail referring to an illustrative embodiment shown in the drawing, in which:

FIG. 2 shows an oil pressure circuit of the speed change controlling device shown in FIG. 1.

Figure 1:
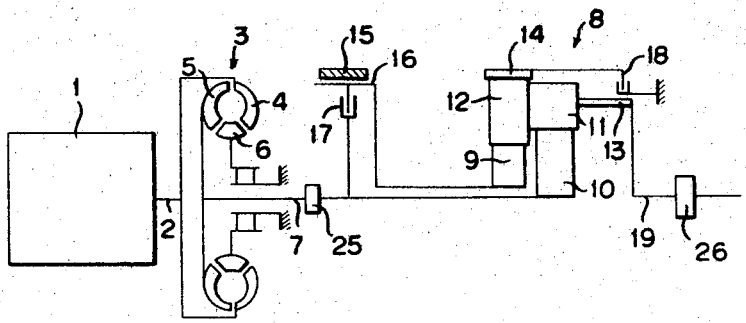
FIG. 1 shows an outline of an automatic speed change device for automotive vehicles having equipped with an embodiment of the speed change controlling device of the present invention.
Figure 3:
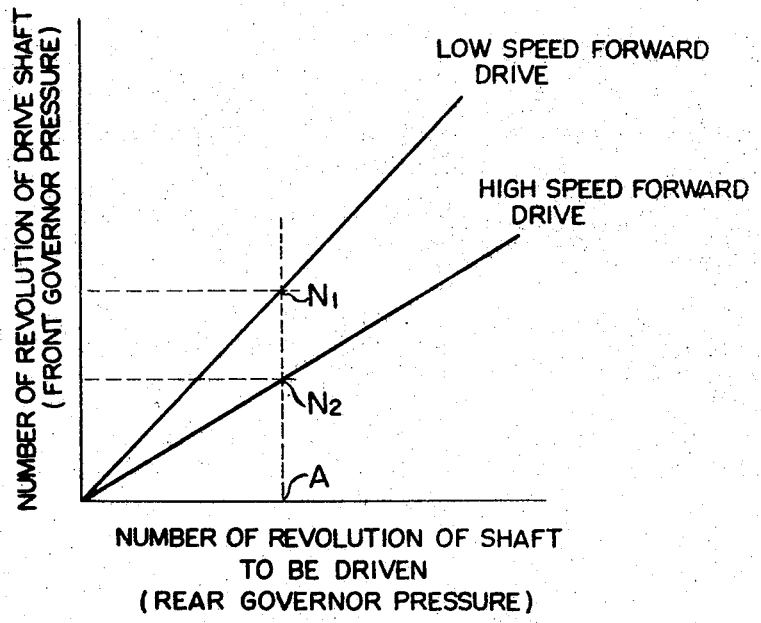
FIG. 3 shows the relationship between the rotational speed of the drive shaft of the automatic speed change device having forward two-stage speed change gears and the speed of the automotive vehicle.

First the explanation is given in accordance with FIG. 1, and 1 is an engine; 2 is a first drive shaft driven by the engine; 3 is a torque converter composed of a pump 4 having the first driving shaft 2 fixed on one end thereof, a turbine 5 to which the driving force is transmitted from the engine 1 by the rotation of the pump 4, and a stator 6. On one side of the turbine 5, a second drive-shaft 7 is fixed, and the driving force transmitted from the pump 4 is transmitted to the second drive-shaft 7 through the turbine 5; 8 is speed change gears of reverse one-stage, forward two-stage comprising a front sun gear 9, a rear sun gear 10, a rear pinion 11, a front pinion 12, a cage 13 for supporting the respective pinions 11 and 12, and a ring gear 14 provided on the outside of the front pinion 12; 15 is a frictional member for low speed (band brake) which binds or loosens a drum 16 fixing the front sun gear 9 on one end thereof to the effect that the rotation of the front sun gear 9 is made impossible or possible; 17 is a frictional member for high speed (clutch) and the second drive shaft 7 and the drum 16 are unitedly connected by the engagement of the frictional member 17 for high speed, and the two are unitedly rotated by the driving force from the engine 1; 18 is a frictional member for reversal (clutch) for releasing or fixing the ring gear 14; 19 is a driven shaft fixed on the rear end of the cage 13.

Now, the explanation is made referring especially FIG. 2, in which 20 is an oil pump driven by the engine 1, and the oil within the oil tank 21 is drawn by the rotation of the oil pump 20, and is discharged into an outlet opening 22; 23 is a main regulating valve for adjusting the oil pressure coming from the oil pump 20 to be appropriate pressure adopted for the respective driving states (this oil pressure is called "line pressure"); 24 is a throttle valve for adjusting the line pressure supplied from the main regulating valve 23 to be an appropriate oil pressure, which is called as throttle pressure, in accordance with the opening degree of the throttle valve of the carburetor (i.e., the degree of the depression of an accelerator-pedal); 25 and 26 are a front governor valve and a rear governor valve for detecting the rotational speeds of the second drive shaft 7 and the driven shaft 19 so as to adjust the oil pressure supplied from the oil pump 20 to be an appropriate oil pressure, which is called as governor pressure, in accordance with the change of the speed of the rotation of the second drive shaft 7 and the driven shaft 19; 27 is a shift valve which opens and closes in accordance with the generated torque of the engine 1 and the vehicle speed by the throttle pressure supplied from the throttle valve 24 and the governor pressure supplied from the rear governor valve 26; 28 is a manual valve for converting the mechanical movement based on the hand-operation of the driver to the oil pressure control, and by using the manual valve 28, the switching over of the neutral (N), drive range (D); low range (L) and reverse range (R); 29 is a low servo valve for operating the frictional member for low speed 15; 30 is a down shift controlling valve which opens and closes in accordance with the change of the governor pressure supplied respectively from the front governor valve 25 and the rear governor valve 26, and by means of the down shift controlling valve 30, the operations for applying or removing oil pressure of the down shift controlling circuit, i.e., the open side circuit of the low servo valve, is smoothly controlled.

Next, the structures of the respective valves and the structure of the oil pressure circuit are explained about.

The throttle valve 24

A throttle valve case 31 has a cylinder 32, within which a pressing piston 33 and a valve piston 34 are provided movably through springs 35 and 36, respectively.

The pressing piston 33 is slidable in accordance with the opening degree of the throttle valve of the carburetor against the spring 35, and the valve piston 34, which has an annular groove 39 provided between large diameter portions 37 and 38, moves rightwardly by the spring 35 due to the movement of the pressing piston 33; 40, 41, 42, 43 and 44 are the openings for passing oil, and among these openings, the opening 42 and the opening 43 are connected with the conduit pipe 46 having a contraction portion 45.

The main adjusting valve 23

A valve box 47 has a cylinder 48 provide with a bore 49 having a small diameter at the right side, and a main piston 50 is freely slidable within the cylinder 48. The main piston 50 has an annular groove 53 between large diameter portions 51 and 52, and is forced to the right by a spring 54 forcedly inserted between the left end of the piston 50 and the left end wall of the cylinder 48; 55 is a bore of an intermediate diameter provided on the right of the bore of the small diameter 49; 55a is an auxiliary piston inserted movably into the bore 55 of an intermediate daimeter, and the auxiliary piston 55a is enforced to the right by a spring 56 pushed between the same and the right end of the main piston 50, and the movement to the left above a certain degree is regulated by a staged portion 57 formed between the bore 55 and the bore 49; 58, 59, 60, 61, 62 and 63 are the openings for passing oil, and the opening 58 is connected to an outlet opening 22 of the oil pump 20 through a conduit pipe 64, and the opening 59 is connected to an opening 40 for passing oil of the throttle valve 24 through a conduit pipe 65. The opening 60 is connected to the oil tank 21 through a conduit pipe 66, and the opening 61 is connected to the opening 41 of the throttle valve 24. The opening 62 is connected to the conduit pipe 64 through a conduit pipe 69 having a contraction portion 68.

The front governor valve 25 and the rear governor valve 26

Valve boxes 70 and 71 have cylinders 72 and 73, respectively, and below these boxes, bores 74 and 75 having larger diameter are provided, respectively; 76 and 77 are the pistons inserted movably into the cylinder 72 and large diameter bore 74 and the cylinder 73 and the large diameter bore 75, respectively, and annular grooves 82 and 83 are provided between a large diameter portion 78 and an intermediate diameter portion 79, and between a large diameter portion 80 and an intermediate diameter portion 81, respectively. Piston rods 84 and 85 are provided on the respective external ends of the piston 76 and the piston 77, and a weight 88 and a weight 89 are movably inserted between respective expanded portions provided on the end of the respective piston rods and the valve boxes 70 and 71 through springs 86 and 87, respectively; 90, 91, 92 and 93 are the openings for passing oil, and the opening 90 is connected to an opening 63 of the main regulating valve 23 through a conduit pipe 94.

The manual valve 28

A valve box 95 has a cylinder 96 inside thereof; 97 is a manually operated piston inserted movably inside the cylinder 96, and annular grooves 101 and 102 are provided between large diameter portions 98 and 99 and 99 and 100 of the manually operated piston 97; 103, 104, 105 and 106 are the openings for passing oil, and the opening 103 is connected to the conduit pipe 64, and the opening 104 is connected through a conduit pipe 107 to opening 108 for the low servo valve 29 for operating the frictional member 15 for low speed, and the low servo-valve 29 has a piston 110 forced to the left by a spring 109. The above mentioned conduit pipe 107 is connected to the openings 91 and 93 for passing oil of the front governor valve 25 and the rear governor valve 26 through conduit pipes 111 and 112.

The shift valve 27

A valve box 113 has cylinders 113a and 113b inside thereof, and 114 is a piston movably inserted into the cylinders 113a and 113b, and the piston 114 has an intermediate diameter portion 115 and a large diameter portion 116; and between the intermediate diameter portion 115 and the large diameter portion 116, an annular groove 117 is formed, and at the same time, the piston 114 is forced to the right with a spring 118 compressed between the same and the left end of the cylinder 113a; 119, 120, 121, 122 and 123 are the openings for passing oil, and the opening 119 is connected to the opening 92 of the rear governor valve 26, the opening 120 is connected to the opening 105 of the manual valve 28, and the opening 121 is connected to the opening 41 of the throttle valve 24 through a conduit pipe 67. On the other hand, the opening 122 is connected to the frictional member 17 for high speed through a conduit pipe 127 having a contraction portion 126, and at the same time it is connected to an opening 131 on the open side of the low servo valve 29, and the opening 123 is connected to the oil tank 21. The frictional member 17 for high speed has a piston 133 pressed to the left by a spring 132.

The down shift controlling valve 30

A valve box 134 has cylinders 135a and 135b inside thereof, and 136 is a piston movably inserted inside the cylinder 135a and the cylinder 135b, and said piston 136 has an intermediate diameter portion 137, the large diameter portion 138, and an annular groove 139 provided on the intermediate diameter portion 137, and the piston 136 is pressed to the right by a spring 140 compressed between the piston 136 and the left end of the cylinder 135a; 141, 142, 143, and 144 are openings for passing oil, and the opening 141 is connected to a conduit pipe 124 through a conduit pipe 145, the opening 142 is connected to the conduit pipe 94 through a conduit pipe 146, and the opening 143 is connected to a conduit pipe 127 through a conduit pipe 130, and the opening 144 is connected to the conduit pipe 129; 147 is a by-passing conduit pipe inserted into the conduit pipe 127 in parallel with a contraction portion 126, and has the check valve 148.

The following is an explanation about the operations of the speed change controlling device having the above given structure of this invention.

(1) The idling state of the vehicle.—FIG. 2 shows the state of a stopping vehicle as the throttle valve is totally closed, and in this state, the engine is started, and when idling is made, the oil pump 20 starts the operation, and oil is drawn from the oil tank 21, and the oil is supplied to the conduit pipe 64 through the outlet opening 22. The line pressure supplied to the conduit pipe 64 is supplied to the opening 58 for passing oil, and at the same time, it is supplied to the opening 103 of the valve 28.

The line pressure supplied to the opening 58 of the main regulating valve 23 is supplied to the opening 40 of the throttle valve 24. In this case, the manual valve 28 is in the state of neutral, and the opening 103 is closed, and therefore, no oil is supplied to the conduit pipes 107 and 125, and the frictional member 15 for low speed and the frictional member 17 for high speed are in the disengaged state, and the driving force from the engine 1 is not transmitted to the driven shaft 19, and the vehicle retains the stopping state.

(2) The starting state of the vehicle.—In the idling state of a vehicle, the manual valve 28 is moved to the drive range (D) and the opening 103 is connected to the annular groove 101, the conduit pipe 64 and the conduit pipe 107 are connected, and the line pressure within the conduit pipe 64 is supplied to the opening 108 of the low servo-valve 29, and the piston 110 is pushed to the right against the spring 109, and the frictional member 15 for low speed binds the drum 16 to stop the same, and the driving force from the engine 1 is transmitted to the driven shaft 19 through the second driving shaft 7, the rear sun-gear 10, the pinions 11 and 12, and the cage 13, and the speed change gear device 8 comes to be low speed forward driving state, and the vehicle starts to move.

(3) The low running state of the vehicle.—As explained before, when the vehicle starts to run, centrifugal force works on the weights 88 and 89 of the front governor valve 25 and the rear governor valve 26 by the rotation of the second driving shaft 7 and the driven shaft 19, and the pistons 76 and 77 are moved to the outside, and the respective openings 91 and 93 are connected to the annular groove 82 or 83, and a part of the line pressure is supplied to the opening 142 of the down shift controlling valve 30 as the front governor pressure through the conduit pipe 111, the opening 91, the annular groove 82, the opening 90, the conduit pipe 94, and the conduit pipe 146.

The line pressure within the conduit pipe 107 is supplied as the rear governor pressure to the opening 141 of the down shift controlling valve 30 through the conduit pipe 145 and the conduit pipe 124, and the piston 136 is pushed to the left, and at the same time the line pressure within the conduit pipe 107 is also supplied to the opening 119 of the shift valve 27 to push the piston 114 to the left.

(4) The up shift from low speed running to high speed running.—When a vehicle is running at a low speed, the speed of the vehicle is raised to a certain speed predetermined in advance by the increase of the rotation speed of the driven shaft 19, and the pushing force for pressing the piston 114 of the shift valve 27 caused by the rear governor pressure adjusted by the rear governor valve 26 becomes larger than the pressure caused by the throttle pressure and the repelling force of the spring 118 for pressing the piston 114, the piston 114 of the shift valve 27 moves to the left against both the spring 118 and the throttle pressure. By the movement of the piston 114, the opening 120 and the annular groove 117 are connected, the conduit pipe 125 and the conduit pipe 127 are connected, and a part of the line pressure within the conduit pipe 64 is supplied to the frictional member 17 for high speed through the conduit pipe 125, the opening 120, the annular groove 117, the opening 122 and the conduit pipe 127 having the contraction portion 126, and the piston 133 is pushed to the right by said line pressure. At the same time, the oil supplied from the shift valve 27 is supplied to the opening 131 on the open side of the low servo valve 29 through the check valve 128 and the conduit pipe 129. The piston 133 is moved to the right, and the frictional member 17 for high speed starts connection and when the movement of the piston 133 almost stops, and the oil pressure within the conduit pipe 127 is raised and the oil pressure within the conduit pipe 129 is also raised till the oil pressure becomes almost equal to the line pressure within the conduit pipe 107, the piston 110 is moved to the left by the cooperation of the line pressure supplied from the opening 131 and the repelling force of the spring 109, and the frictional member 15 for low speed and the drum 16 are disengaged. Thus, the frictional member 17 for high speed is connected, and during the frictional member 15 for low speed and the drum 16 are disengaged, the rotation speed of the second drive shaft 7 is lowered to an appropriate rotation speed in accordance with the speed change ratio of the high speed forward driving, i.e., the speed change ratio after the speed change, and the speed change gear device 8 is smoothly up-shifted from the low speed forward driving to the high speed forward driving.

(5) The high speed running state.—When the up shift is finished, the rotation speeds of the second drive shaft 7 and the driven shaft 19 become equal (in the case of the forward two-stage speed change device, the speed change drive shaft and the driven shaft are rotated at the speed ratio of 1:1 in the second speed, in most cases), and when the rear governor pressure adjusted by the rear governor valve 26 and the front governor pressure adjusted by the front governor valve 25 become equal, the pressure for pushing the piston 136 of the down shift controlling valve 30 to the left becomes larger than the repelling force of the spring 140 and the pressure for pushing the piston 136 to the right, and the piston 136 is moved to the left by this pressure difference, and the opening 143 is blocked by the intermediate diameter portion 137, and the conduit pipe 130 and the conduit pipe 129 are blocked.

(6) The down shift from high speed running to low speed running.—When a vehicle is running at a high speed, if the running speed of the vehicle should be lowered, the rear governor pressure from the rear governor valve 26 is lowered, and the piston 114 of the shift valve 27 is moved to the right by the throttle pressure and the repelling force of the spring 118, so that the opening 120 is blocked by the larger diameter portion 116 of the piston 114 and the opening 123 is opened by the intermediate diameter portion 115, the oil pushing the piston 133 of the frictional member 17 for high speed is quickly discharged into the oil tank 21 through the conduit pipe 127, the conduit pipe 147, the check valve 148, the opening 122, the annual groove 117 and the opening 123. In this case, along with the lowering of the rear governor pressure, the front governor pressure is also lowered, and therefore the piston 136 of the down shift controlling valve 30 is not displaced. Therefore, the frictional member 17 for high speed is disconnected, and the speed change gear device 8 is set to be neutral, and the driving force from the second driving shaft 7 is not transmitted to the driven shaft 19.

When the speed change gear device 8 becomes neutral, and the load given on the engine is reduced, the rotation speed of the engine 1 is raised, and at the same time, the rotation speed of the second drive shaft 7 and the front governor pressure adjusted by the front governor valve 25 are also raised. When the rotation speed of the second drive shaft 7 is raised close to a speed corresponding to the speed change ratio of the low speed forward drive, the front governor pressure adjusted by the front governor valve 25 and by the repelling force of the spring 140, the pressure for pushing the piston 136 of the down shift controlling valve 30 to the right becomes larger than the pressure for pushing the piston 136 to the left by the rear governor pressure adjusted by the rear governor valve 26 so that the piston 136 is moved to the right. The oil which has been included within the open side of the low servo valve 29 for stopping the piston 110 to the left is quickly discharged into the oil tank 21 through the conduit pipe 129, the opening 144 of the down shift controlling valve, the annular groove 139, the opening 143, the conduit pipe 130, the conduit pipe 147, the check valve 148, the conduit pipe 127, the opening 122, the annular groove 117, and the opening 123. Thereby, the piston 110 of the low servo valve 29 is moved to the right by the line pressure sent through the conduit pipe 107, and the frictional member 15 for low speed and the drum 16 are engaged, and the speed change gear device 8 becomes in the state of low speed forward drive.

As is apparent from the above given explanation, in accordance with this invention, the down shift controlling valve provided in the down shift controlling circuit is controlled by the oil pressure adjusted by, for example, the governor valves provided for detecting the rotation speeds of the driving shaft and driven shaft, on these shafts which are provided in front of and behind the speed change gear device, respectively, and therefore, it is possible to retain the most appropriate neutral time in accordance with any speed change point and at the same time it is possible to perfectly eliminate the shock at the time of speed change, and the efficiency of speed change can be improved.

The above are the explanations about the embodiment of forward two-stage automatic speed change device, but this invention can be applied to forward three-stage automatic speed change and forward four-stage automatic speed change gear or other automatic speed change devices.

What is claimed is:

1. In a speed change control device for automatic transmission control system, the combination of a drive shaft, driven shaft, means for providing a low speed power train between said shafts including a first servomotor, means for providing a high speed power train between said shafts including a second servomotor, a source of fluid pressure for operating said servomotors, a first detecting device driven by said drive shaft for providing a first signal that varies with the speed of said drive shaft, a second detecting device driven by said driven shaft for providing a second signal that varies with the speed of said driven shaft, shift valve means connected to said source for directing fluid from said source to either one of said servomotors, said shift valve means having a low position for establishing a low speed power train and high position for establishing a high speed power train, conduit means connecting said shift valve means with said servomotors for delivering the fluid, down shift controlling valve means including a valve element having a first end connected to said first detecting device and a second end connected to said second detecting device, said down shift controlling valve means under the control of said first detecting means and said second detecting means for controlling the time gap between disengagement of said second servomotor and engagement of said first servomotor when said shift valve is shifted from said high position to said low position in accordance with the speed of said shafts.

2. In a speed change control device for automatic transmission control system, the combination of a drive shaft, driven shaft, means for providing a low speed power train between said shafts including a first servomotor, means for providing a high speed power train between said shafts including a second servomotor, a sourve of fluid pressure for operating said servomotors, a first governor driven by said drive shaft for providing a first governor pressure that increases with the speed of said drive shaft, a second governor driven by said driven shaft for providing a second governor pressure that increases with the speed of said driven shaft, a shift valve connected to said source for directing fluid from said source to either one of said servomotors and including a valve piston having a low position for establishing a low speed power train and a high position for establishing a high speed power train, a conduit connecting said shift valve with said servomotors for delivering the fluid and including a first branch conduit connected to said first servomotor and a second branch conduit connected to said second servomotor, and a down shift controlling valve including a valve element having a first end connected to said first governor and a second end connected to said second governor, said down shift controlling valve under the control of said first and second governor pressure for blocking the fluid flow in said first branch conduit to delay the engagement of said first servomotor when said shift valve is shifted from said high position to said low position in accordance with the speed of said shafts.

References Cited

UNITED STATES PATENTS

| | | | |
|---|---|---|---|
| 3,004,447 | 10/1961 | Sand | 74—868 |
| 3,053,107 | 9/1962 | Winchell | 74—868 |
| 3,053,116 | 9/1962 | Christenson et al. | 74—868 X |

ARTHUR T. McKEON, Primary Examiner.